US009669929B2

(12) United States Patent
Hesse et al.

(10) Patent No.: US 9,669,929 B2
(45) Date of Patent: Jun. 6, 2017

(54) STORAGE ASSEMBLY WITH A CONVEYING DEVICE INTEGRATED INTO A STORAGE CONTAINER

(71) Applicant: Airbus Operations GmbH, Hamburg (DE)

(72) Inventors: Ullrich Hesse, Affalterbach (DE); Markus Piesker, Hamburg (DE); Martin Sieme, Hamburg (DE); Gerd Wedler, Dresden (DE); Philipp Goldmann, Dresden (DE); Sebastian Roering, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 332 days.

(21) Appl. No.: 14/310,417

(22) Filed: Jun. 20, 2014

(65) Prior Publication Data

US 2014/0298841 A1    Oct. 9, 2014

Related U.S. Application Data

(63) Continuation of application No. PCT/EP2012/076175, filed on Dec. 19, 2012.
(Continued)

(30) Foreign Application Priority Data

Dec. 20, 2011 (DE) .......... 10 2011 121 745

(51) Int. Cl.
*B64D 11/00* (2006.01)
*F25B 41/00* (2006.01)
*B64D 13/06* (2006.01)

(52) U.S. Cl.
CPC .......... *B64D 11/00* (2013.01); *B64D 13/06* (2013.01); *F25B 41/00* (2013.01);
(Continued)

(58) Field of Classification Search
CPC ...... F25B 41/00; F25B 45/00; F25B 2345/00; F25B 2345/001; F25B 2345/002;
(Continued)

(56) References Cited

U.S. PATENT DOCUMENTS

| 3,434,492 A | 3/1969 | McMullen |
| 5,181,838 A | 1/1993 | Sato et al. |

(Continued)

FOREIGN PATENT DOCUMENTS

| DE | 1551601 | 2/1970 |
| DE | 102004043079 | 3/2006 |

(Continued)

OTHER PUBLICATIONS

International Search Report, Mar. 5, 2013.

*Primary Examiner* — Marc Norman
(74) *Attorney, Agent, or Firm* — Greer, Burns & Crain, Ltd.

(57) ABSTRACT

A storage assembly, which is in particular suitable for use in a cooling system designed for an operation with a two-phase coolant medium, comprising a storage container with a receiving area for receiving a coolant medium and a conveying device for conveying coolant medium from the receiving area of the storage container. The conveying device is formed integral with the storage container of the storage assembly.

13 Claims, 5 Drawing Sheets

Related U.S. Application Data

(60) Provisional application No. 61/577,755, filed on Dec. 20, 2011.

(52) U.S. Cl.
CPC ........... *B64D 2013/0629* (2013.01); *B64D 2013/0674* (2013.01); *F25B 2400/16* (2013.01); *F25B 2700/19* (2013.01); *F25B 2700/2108* (2013.01); *Y02T 50/56* (2013.01)

(58) Field of Classification Search
CPC ............ F25B 2345/003; F25B 2400/16; F25B 2700/19; F25B 2700/2108; B64D 11/00; B64D 13/06; B64D 2013/0629; B64D 2013/0674; Y02T 50/56
USPC .......................................................... 62/149
See application file for complete search history.

(56) References Cited

U.S. PATENT DOCUMENTS

| | | |
|---|---|---|
| 2009/0002948 A1 | 1/2009 | Jarlestal |
| 2014/0090407 A1 | 4/2014 | Piesker |

FOREIGN PATENT DOCUMENTS

| | | |
|---|---|---|
| DE | 102006005035 | 9/2007 |
| DE | 102009011797 | 9/2010 |
| DE | 102011014943 | 9/2012 |
| DE | 102011014954 | 9/2012 |
| EP | 0460551 | 12/1991 |
| EP | 1902950 | 3/2008 |
| JP | 2003065618 | 3/2003 |

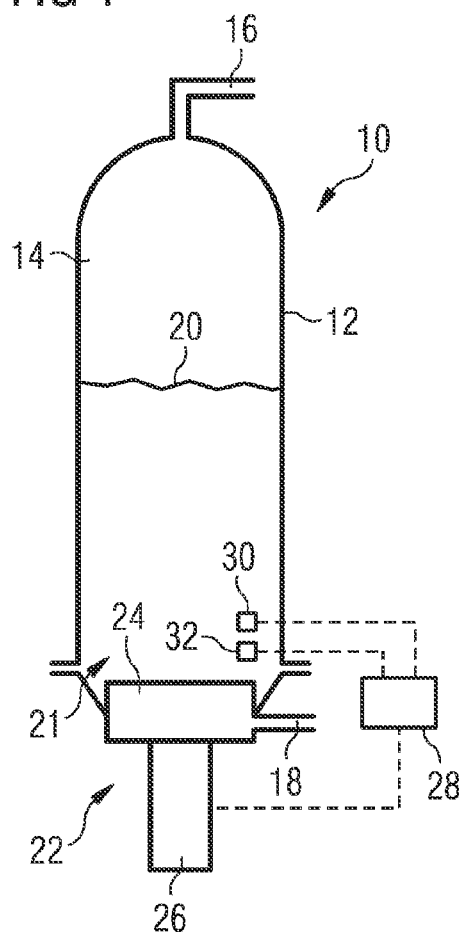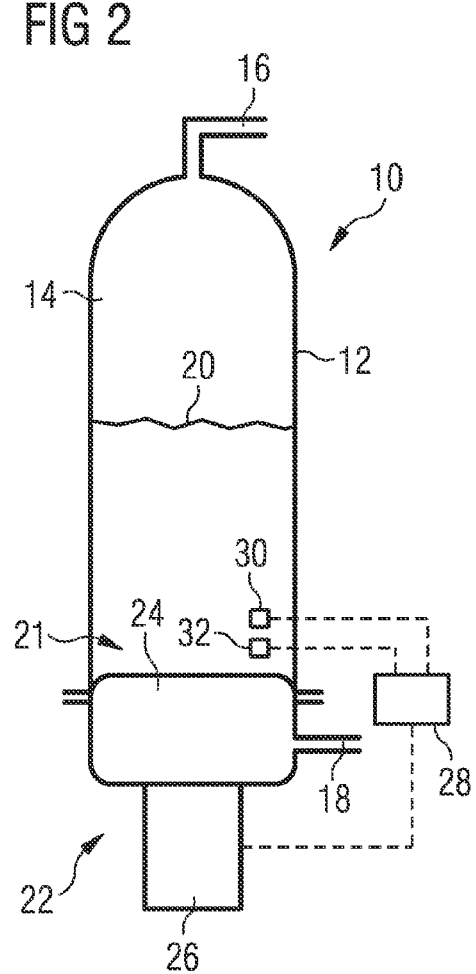

STORAGE ASSEMBLY WITH A CONVEYING DEVICE INTEGRATED INTO A STORAGE CONTAINER

CROSS-REFERENCES TO RELATED APPLICATIONS

This application is a continuation of International Application PCT/EP2012/076175 filed Dec. 19, 2012, designating the United States and published on Jun. 27, 2013 as WO 2013/092728. This application also claims the benefit of the U.S. Provisional Application No. 61/577,755, filed on Dec. 20, 2011, and of the German patent application No. 10 2011 121 745.6, filed on Dec. 20, 2011, the entire disclosures of which are incorporated herein by way of reference.

BACKGROUND OF THE INVENTION

The invention relates to a storage assembly for storing coolant medium circulating in a cooling circuit of a cooling system, which storage assembly is in particular suitable for use in a cooling system designed for an operation with a two-phase coolant medium for cooling food on board an aircraft.

Cooling systems suitable for an operation with a two-phase coolant medium are known from DE 10 2006 005 035 B2 and DE 10 2009 011 797 A1 and are used, for example, for cooling food that is stored on board a passenger aircraft and that is to be distributed to the passengers. The food that is to be given to the passengers is typically kept in mobile transport containers. The transport containers are filled outside the aircraft, pre-cooled and, after being loaded into the aircraft, placed in corresponding storage positions in the aircraft passenger cabin, for example in the galleys. In order to ensure that the food remains fresh until it is distributed to the passengers, cooling stations are provided in the region of the transport container storage positions, which cooling stations are supplied with cooling energy from a central cold-producing device and deliver that cooling energy to the transport containers with the food stored therein.

The advantages of a cooling system with a central cold-producing device over cold-producing units provided separately at the individual transport container storage positions are that it has a smaller installation space and a lower weight, and in addition it requires a lower outlay in terms of assembly and maintenance. In addition, the use of a cooling system that has a central cold-producing device arranged outside the passenger cabin makes it possible to avoid machine noises which are produced by cold-producing units positioned in the region of the transport container storage positions and which can be heard in the aircraft passenger cabin and may accordingly be perceived as disturbing.

In the cooling systems known from DE 10 2006 005 035 B3 and DE 10 2009 011 797 A1, the phase changes of the coolant medium flowing through the cooling circuit of the cooling systems that take place during operation of the system allow the latent heat consumption that occurs thereby to be used for cooling purposes. The mass flow of coolant medium required to provide a desired cooling efficiency is therefore significantly lower than, for example, in a liquid cooling system in which a single-phase liquid coolant medium is used. Consequently, the cooling systems described in DE 10 2006 005 035 B3 and DE 10 2009 011 797 A1 can have smaller pipe cross-sections than a liquid cooling system of comparable cooling efficiency. Furthermore, the reduction in the mass flow of coolant medium allows the conveying power required to convey the coolant medium through the cooling circuit of the cooling system to be reduced. This results in increased efficiency of the system, because less energy is required to operate a corresponding conveying device, such as, for example, a pump, and, moreover, less additional heat generated by the conveying device during operation of the conveying device has to be dissipated from the cooling system.

In the cooling systems known from the prior art, the two-phase coolant medium is conventionally stored intermediately in the form of a boiling liquid in storage containers which are integrated into the cooling circuits of the cooling systems. In order to avoid increased wear of a conveying device, for example in the form of a pump, for conveying coolant medium from a storage container, the conveying of steam through the conveying device and the formation of steam bubbles (cavitation) in the conveying device must be prevented as far as possible.

To that end, corresponding subcooling of the coolant medium stored intermediately in the storage containers is necessary. That is generally brought about by a pressure increase, which is generally achieved by arranging a suction nozzle of the conveying device in a defined position beneath a sump of the storage container, from which the coolant medium stored intermediately in the storage container is discharged from the storage container. In other words, the conveying device is so positioned relative to the storage container that a minimum positive suction head, which is defined by the height of a column of liquid above a leading edge of a moving blade of the conveying device, is maintained for the conveying device. The force of gravity of the column of liquid causes a defined pressure build-up in the coolant medium fed into the conveying device and thus effects subcooling of the coolant medium, that is to say prevents condensation of the coolant medium.

When installing a cooling system in an aircraft, however, the problem frequently occurs that it is difficult to accommodate the system components in the only very limited installation space or even, as described above, to position them relative to one another so that, for example, by using the force of gravity of a column of liquid above a leading edge of a moving blade of a conveying device, a pressure increase in the coolant medium fed to the conveying device can be achieved, thus preventing condensation of the coolant medium by the pressure reduction caused by the conveying device.

DE 10 2011 014 954, which is not prior-published, therefore proposes equipping a storage assembly which is suitable for use in a cooling system designed for an operation with a two-phase coolant medium for storing coolant medium circulating in a cooling circuit of the cooling system with a liquefier which is configured to condense coolant medium which is to be received in a receiving area of the storage container before it is fed into the receiving area of the storage container. The storage assembly further comprises a heat exchanger which is arranged in the receiving area of the storage container and which ensures that coolant medium discharged from the receiving area of the storage container is always subcooled sufficiently. As a result, it is ensured that the coolant medium is always fed in the liquid state to a conveying device for discharging coolant medium from the receiving area of the storage container.

SUMMARY OF THE INVENTION

The object underlying the invention is to provide a storage assembly which is suitable for use in a cooling system designed for an operation with a two-phase coolant medium for storing coolant medium circulating in a cooling circuit of the cooling system, which storage assembly permits low-wear operation of a conveying device for discharging coolant medium from the storage assembly.

A storage assembly according to the invention, which in particular is suitable for use in a cooling system designed for an operation with a two-phase coolant medium, for example a cooling system for cooling food on board an aircraft, comprises a storage container with a receiving area for receiving a coolant medium which is arranged in an interior space of the storage container. During operation of a cooling system equipped with the storage assembly, the storage container may serve to receive and intermediately store coolant medium circulating in a cooling circuit of the cooling system during operation of the cooling system.

The coolant medium that is to be received in the receiving area of the storage container is preferably a coolant medium that may be converted from the liquid to the gaseous state of aggregation when it delivers its cooling energy to a device that is to be cooled and may then be returned to the liquid state of aggregation again by appropriate pressure and temperature control. For example, the receiving area of the storage container may be configured to receive $CO_2$ or R134A ($CH_2F$—$CF_3$) as the coolant medium. In the receiving area of the storage container, the coolant medium is usually in the form of a boiling liquid. The receiving area, that is to say a casing surrounding the receiving area, must therefore be so designed that it is able to withstand the pressure of the coolant medium in the form of a boiling liquid without being damaged.

The storage assembly according to the invention further comprises a conveying device for conveying coolant medium from the receiving area of the storage container. Depending upon the design and operation of the storage assembly, the conveying device may be a conveying device for conveying a liquid coolant medium or a conveying device for conveying a gaseous coolant medium. A conveying device for conveying a liquid coolant medium may be designed in the form of a pump, for example, while a conveying device for conveying a gaseous coolant medium may be designed in the form of a compressor, for example. A conveying device suitable for conveying a liquid coolant medium is preferably provided to convey liquid coolant medium from a sump of the storage container receiving area. A conveying device suitable for conveying a gaseous coolant medium, on the other hand, preferably increases, during operation, the pressure in a coolant medium gas phase that is present in the receiving area of the storage container above a liquid level, whereby coolant medium in the liquid state of aggregation is pushed out of the sump of the storage container receiving area.

In the storage assembly according to the invention, the conveying device is formed integral with the storage container of the storage assembly. A conveying device formed integral with the storage container of the storage assembly is here understood as being a conveying device that forms a unit or a component group together with the storage container of the storage assembly. In particular, a storage assembly which comprises a conveying device formed integral with the storage container within the context of this application is distinguished by the fact that the conveying device is attached directly to the receiving area of the storage container in such a manner that a pipe between the storage container and the conveying device can be omitted.

The omission of a pipe that connects the storage container to the conveying device means that it is no longer necessary, in particular when starting the conveying device, to discharge from the pipe any gaseous coolant medium that may be present in the pipe. In addition, the formation of steam bubbles in the pipe as a result of the introduction of heat from the outside at high outside temperatures is avoided. Finally, the omission of the pipe between the storage container and the conveying device makes it possible to prevent the formation of a low pressure on the suction side of the conveying device and cavitation caused thereby.

Accordingly, during operation of a conveying device which serves to convey liquid coolant medium, a dry run of the conveying device, in particular when starting the conveying device, can be eliminated. The wear of the conveying device is significantly reduced as a result. In addition, the risk of a disruption in the flow of coolant medium and a resulting malfunction of the conveying device can be reduced. Finally, the integration of the conveying device into the storage container prevents excessive heating of the conveying device at high outside temperatures or during start-up operation, so that the condensation of liquid coolant medium fed to the conveying device and the resulting wear effect can be eliminated.

The conveying device of the storage assembly according to the invention is preferably designed in the form of a conveying device suitable for conveying liquid coolant medium. The advantages of the configuration according to the invention of the storage assembly then have a particular effect. In addition, the use of a conveying device suitable for conveying liquid coolant medium avoids a rise in the temperature of the coolant medium, which is an inevitable consequence of the compression of the gaseous coolant medium in the receiving area of the storage container when a conveying device suitable for conveying gaseous coolant medium is used. Therefore, the use of a conveying device for conveying the coolant medium in the liquid state of aggregation means that it is no longer necessary to dissipate that heat energy additionally introduced into the coolant medium, for example in the course of a liquefaction process. In addition, conveying devices suitable for conveying liquids are generally more energy-saving and of smaller volume than conveying devices suitable for conveying gaseous media. The conveying device of the storage assembly according to the invention may in particular be designed in the form of a pump. There is suitable for use in the storage assembly according to the invention preferably a gear pump, a side channel pump, a peripheral impeller pump or a centrifugal pump.

The conveying device of the storage assembly according to the invention preferably comprises a conveying unit and a drive unit. It is possible in principle to position the conveying unit of the conveying device inside the storage container but outside the receiving area of the storage container. However, the conveying unit of the conveying device is preferably arranged at least partially inside the receiving area of the storage container in such a manner that the conveying unit of the conveying device is flooded with the coolant medium received in the receiving area of the storage container. If the conveying unit of the conveying device is always flooded with coolant medium, a dry run of the conveying device, in particular when starting the conveying device, is reliably eliminated. In addition, excessive heating of the conveying device and cavitation resulting therefrom by condensation of liquid coolant medium on hot components of the conveying device is prevented.

In particular, it is advantageous to arrange the conveying unit of the conveying device at least partially in the region of a sump of the storage container receiving area, so that the conveying unit of the conveying device is flooded with liquid coolant medium from the sump of the storage container receiving area. Accordingly, the conveying unit of the conveying device is preferably located at least in particular operating phases of the storage assembly beneath a liquid level of the coolant medium in the receiving area of the storage container. It is thereby ensured that the conveying unit of the conveying device is already flooded with liquid coolant medium even when the system is started.

The conveying unit of the conveying device may be arranged wholly inside the receiving area of the storage container. Furthermore, the conveying unit of the conveying device may form part of the storage container receiving area, that is to say, for example, a boundary of the storage container receiving area on the sump side. Finally, it is conceivable to position a first region of the conveying unit of the conveying device inside and a second region of the conveying unit of the conveying device outside the storage container receiving area. However, the conveying unit of the conveying device must then be guided in a fluid- and pressure-tight manner through a wall delimiting the storage container receiving area.

The drive unit of the conveying device may be arranged outside the receiving area of the storage container. The drive unit then has no direct contact with the coolant medium received in the receiving area of the storage container. If the conveying unit of the conveying device is arranged at least partially inside the receiving area of the storage container, however, it is then necessary to ensure that there is proper sealing between the drive unit and the conveying device. This can be achieved with the aid of shaft seals, such as, for example, single- or double-acting end face mechanical seals or packing glands. Such seals may, however, be susceptible to faults, which would adversely affect the reliability of the storage assembly in operation.

As an alternative it is conceivable to position the drive unit of the conveying device inside the receiving area of the storage container. However, corresponding electric cables which supply power to the drive unit must then be guided in a sealed manner through the conveying unit of the conveying device and/or through the receiving area of the storage container. The necessity of sealing electric cables can increase the susceptibility of the storage assembly to faults.

It is therefore advantageous to arrange the drive unit of the conveying device partially inside the receiving area of the storage container. For example, components that are connected to a conveying unit arranged inside the receiving area of the storage container, in particular moving components of the drive unit, may be placed inside the receiving area of the storage container. Sections of the drive unit that are to be connected to corresponding electric connecting cables, on the other hand, may advantageously be arranged outside the receiving area of the storage container. As a result, it is not necessary to guide electric cables in an appropriately sealed manner into the receiving area of the storage container. By contrast, it is comparatively simple to seal a section, in particular a stationary section, of the drive unit properly with respect to a wall delimiting the receiving area of the storage container.

In a preferred embodiment of the storage assembly according to the invention, the drive unit of the conveying device is designed in the form of an electric motor, in particular in the form of an electric motor with a permanent-magnetic synchronous coupling, or in the form of a canned motor. A drive unit of such a form may be sealed with little maintenance and is only slightly susceptible to faults.

The storage assembly according to the invention preferably comprises a control unit which is configured to control the drive unit of the conveying device in dependence on the state of aggregation of the coolant medium conveyed by the conveying device, in such a manner that wear of the conveying device is minimized. The control unit may be designed in the form of an electronic control unit, for example. As discussed above, the wear load of the conveying device in operation is dependent substantially on the state of aggregation of the coolant medium conveyed by the conveying device. Consideration of the state of aggregation of the coolant medium when controlling the operation of the drive unit can therefore make a substantial contribution towards reducing cavitation and hence the wear of the conveying device.

The control unit may be configured to determine the state of aggregation of the coolant medium conveyed by the conveying device on the basis of signals from a pressure sensor and/or a temperature sensor. The pressure sensor and/or the temperature sensor is/are preferably arranged in a sump of the receiving area of the storage container. The degree of subcooling of the coolant medium in the receiving area of the storage container can thereby be determined, and critical or unstable conditions, in which the coolant medium increasingly changes to the gas phase, can consequently be detected.

The control unit may in particular be configured to control the drive unit of the conveying device in such a manner that the drive power of the drive unit is reduced if there is a risk that the coolant medium conveyed by the conveying device is at least partially in the gaseous state of aggregation. That may be the case, for example, on starting the conveying device when there is a risk, for example because of high ambient temperatures, that coolant medium fed to the conveying device will condense on hot components of the conveying device, or when the degree of subcooling of the coolant medium in the receiving area of the storage container is reduced because of pressure and/or temperature fluctuations in the storage container or in a primary cooling system equipped with the storage assembly.

Alternatively or in addition thereto, the control unit may also provide a reduction of the drive power of the drive unit when a cooling system equipped with the storage assembly according to the invention is operated with low cooling efficiency. Controlling the drive unit of the conveying device in that manner likewise enables the wear of the conveying device to be minimized and, in addition, the energy consumption of the conveying device to be lowered.

An above-described storage assembly is particularly advantageously suitable for use in a cooling system on board an aircraft. The cooling system may serve, for example, to cool food or electrical or electronic systems.

BRIEF DESCRIPTION OF THE DRAWINGS

Preferred embodiments of the invention will be explained in greater detail below with reference to the accompanying schematic drawings, in which FIG. 1 shows a storage assembly with a conveying device integrated into a vertical storage container, FIG. 2 shows a further storage assembly with a conveying device integrated into a vertical storage container.

DETAILED DESCRIPTION OF THE PREFERRED EMBODIMENTS

Figure 3:
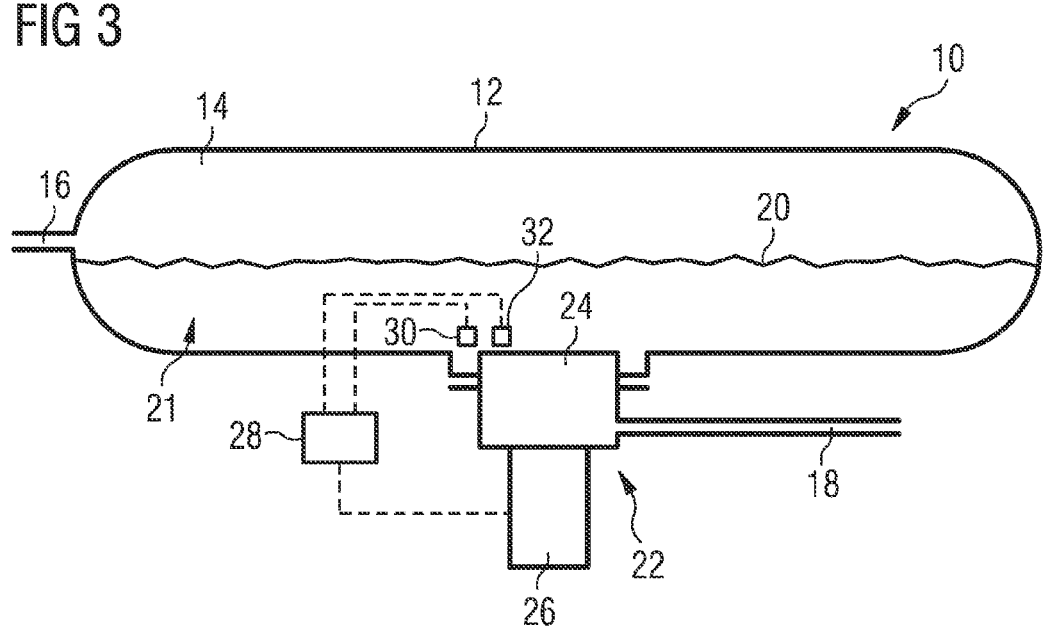
FIG. 3 shows a storage assembly with a conveying device integrated into a horizontal storage container.

FIGS. 1 to 10 show various embodiments of a storage assembly 10 which in particular is suitable for use in a cooling system designed for an operation with a two-phase coolant medium. The storage assembly 10 comprises a storage container 12, in the interior space of which there is arranged a receiving area 14 for receiving a coolant medium. The coolant medium that is to be received in the receiving area 14 of the storage container 12 is a two-phase coolant medium, for example $CO_2$ or R134A. During operation of the storage assembly 10, the coolant medium received in the receiving area 14 of the storage container is usually in the form of a boiling liquid. The receiving area 14, that is to say a casing surrounding the receiving area, is therefore to be so designed that it is able to withstand the pressure of the coolant medium received in the receiving area 14 in the form of a boiling liquid without being damaged. The storage container may be a storage container described in DE 10 2011 014 954, which is not prior-published, or a storage container described in DE 2011 014 943, which is likewise not prior-published.

Coolant medium is fed to the receiving area 14 of the storage container 12 by way of a coolant medium inlet 16. The discharge of coolant medium from the receiving area 14 of the storage container 12 takes place by way of a coolant medium outlet 18. The coolant medium inlet 16 is located in a head or end region of the storage container 12, while the coolant medium outlet 18 is connected to the storage container receiving area 14 in the region of a sump 21 of the storage container receiving area 14. As already mentioned, the coolant medium in the receiving area 14 of the storage container 12 is usually in the form of a boiling liquid, that is to say the coolant medium is in the liquid state of aggregation in the region of the sump 21 of the storage container receiving area 14, while a coolant medium gas phase is present above a liquid level 20 of the coolant medium.

For conveying the coolant medium from the receiving area 14 of the storage container 12, the storage assembly 10 comprises a conveying device 22. In the exemplary embodiments shown here, the conveying device 22 is configured to convey coolant medium in the liquid state of aggregation from the receiving area 14 of the storage container 12. In particular, the conveying device 22 is designed in the form of a pump, for example in the form of a gear pump, a side channel pump, a peripheral impeller pump or a centrifugal pump. The conveying device 22 comprises a conveying unit 24 and also a drive unit 26. The drive unit 26 of the conveying device 22 may be designed in the form of an electric motor, for example, in particular in the form of an electric motor with a permanent-magnetic synchronous coupling, or in the form of a canned motor.

The conveying device 22 of the storage assembly 10 is formed integral with the storage container 12, that is to say there is no pipe connection in the storage assembly 10 between the storage container 12 and the conveying device 22. In the assemblies according to FIGS. 1 and 2, the conveying unit 24 of the conveying device 22 forms part of the receiving area 14 of the storage container 12. According to FIG. 1, the conveying unit 24 is integrated at the deepest point of a curved base of the receiving area 14, in the assembly according to FIG. 2, the base of the receiving area 14 is not curved. Such a form of the storage container 12 is conceivable in particular in the case of small storage container diameters.

The conveying unit 24 is positioned at least partially inside the receiving area 14 beneath the liquid level 20, so that the liquid coolant medium can flow from the sump 21 of the receiving area 14 directly into the conveying unit 24. The inlet of the conveying unit 24 is designed in such a form, in terms of flow technology, that cavitation in the inlet of the conveying unit 24 can almost be ruled out.

In the storage assemblies 10 according to FIGS. 1 and 2, the drive unit 26 of the conveying device 22 is placed outside the receiving area 14 of the storage container 12, that is to say the drive unit 26 is not in direct contact with the coolant medium. However, the drive unit 26 must be sealed with respect to the conveying unit 24. Shaft seals, single- or double-acting end face mechanical seals or packing glands may be used for that purpose.

The operation of the drive unit 26 is controlled by means of an electronic control unit 28. To that end, the electronic control unit 28 receives signals from a temperature sensor 30 arranged in the region of the sump 21 of the receiving area 14 and from a pressure sensor 32 likewise arranged in the region of the sump 21 of the receiving area 14. The signals from the temperature sensor 30 and from the pressure sensor 32 provide the control unit 28 with information about the state of aggregation of the coolant medium. In particular, the electronic control unit 28 is able to detect, on the basis of the signals from the sensors 30, 32, critical or unstable system conditions, in which there is a risk that the coolant medium conveyed by the conveying device 22 is at least partially in the gaseous state of aggregation.

Such critical or unstable conditions can occur, for example, when starting a cooling system comprising the storage assembly 10 or when starting the conveying device 22, for example when there is the risk that the coolant medium will condense on hot components of the conveying device 22. Furthermore, pressure or temperature fluctuations in the storage container 12 or in the primary cooling system may affect the state of aggregation of the coolant medium that is to be conveyed by the conveying device 22, so that the degree of subcooling of the coolant medium falls and consequently there is a risk that the coolant medium is at least partially in the gaseous state of aggregation when it is conveyed by means of the conveying device 22.

The control unit 28 controls the conveying device 22, that is to say in particular the drive unit 26 of the conveying device 22, in such a manner that wear of the conveying device is minimized. In order to achieve that aim, the control unit 28 controls the drive unit 26 of the conveying device 22 in such a manner that the drive power of the drive unit 26 is reduced in critical or unstable operating conditions, when there is a risk that the coolant medium conveyed by the conveying device 22 is at least partially in the gaseous state of aggregation. In other words, the control unit 28 reduces the speed of the drive unit 26 and consequently reduces the speed of the conveying unit 24.

During operation of the storage assembly 10, the control unit 28 controls the drive power of the drive unit 26 continuously in dependence on the signals from the sensors 30, 32, that is to say the drive power of the drive unit 26, under the control of the control unit 28, is reduced whenever there is a risk that the coolant medium conveyed by the conveying device 22 is at least partially in the gaseous state of aggregation. When the cooling system or the conveying device 22 is started, the control unit 28 may likewise use the signals from the sensors 30, 32 to control the operation of the drive unit 26. Alternatively, the drive unit 26 of the conveying device 22 may, however, also be operated in principle with reduced power by the control unit 28 when the cooling system or the conveying device 22 is started. In addition, the workload of the primary cooling system in which the storage assembly 10 is integrated may be taken into account when controlling the drive power of the drive unit 26. In particular, the control unit 28 may operate the drive unit 26 with reduced drive power when the requirement of the cooling system for cooling power is low. Such control of the drive unit 26 allows the wear of the conveying device 22 to be kept low and the energy consumption during operation of the conveying device 22 to be reduced.

The electronic control unit 28 may increase or reduce the drive power of the drive unit 26 stepwise. For example, control of the drive power of the drive unit 26 in a plurality of steps, for example two or three steps, may be provided. However, continuous control of the drive power of the drive unit 26 is also conceivable as an alternative.

The storage assembly 10 shown in FIG. 3 differs from the assembly according to FIGS. 1 and 2 in that the storage container 12 of the storage assembly 10 is arranged horizontally and the conveying device 22 is integrated into the storage container 12 in the region of a storage container jacket. The conveying device 22 is arranged at the deepest point of the storage container 12, so that the conveying unit 24 of the conveying device 22 can again be flooded directly with liquid coolant medium from the sump of the storage container receiving area 14. The column of liquid in the feed of the conveying unit 24 is, however, lower than in the assemblies with a vertical storage container 12 according to FIGS. 1 and 2. In addition, integration of the conveying device 22 in the region of a jacket of the storage container 12 may require the storage container 12 and/or the components of the conveying device 22 to be reinforced in order to ensure that all the components are able to withstand the pressure prevailing in the receiving area 14. The weight of the storage assembly 10 according to FIG. 3 may therefore be greater than the weight of a storage assembly 10 in which the conveying device 22 is integrated into the storage container 12 at an end face.

Figure 4:
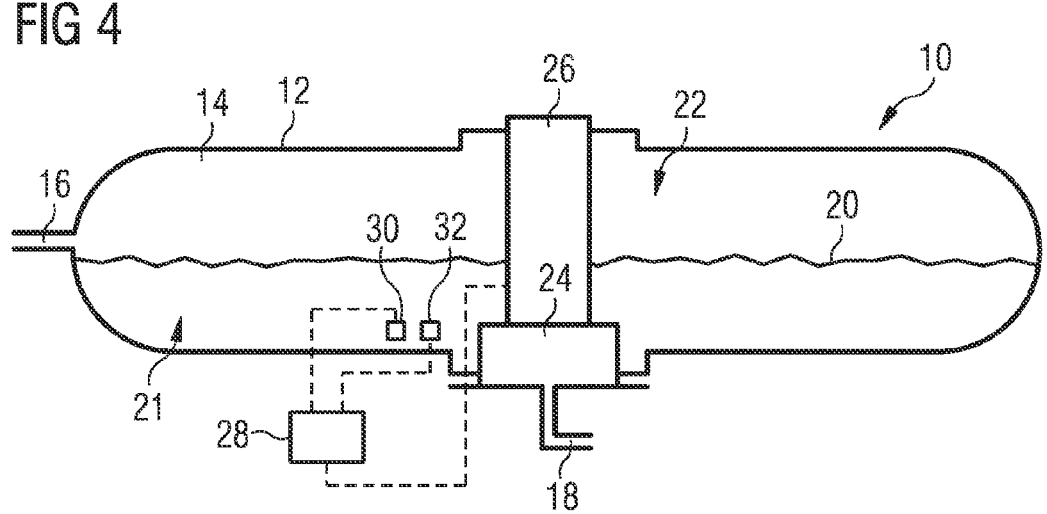
FIG. 4 shows a further storage assembly with a conveying device integrated into a horizontal storage container, wherein a drive unit of the conveying device is arranged partially inside a receiving area of the storage container.

The storage assembly 10 shown in FIG. 4 differs from the assembly according to FIG. 3 in that the drive unit 26 of the conveying device 22 is also largely integrated into the receiving area 14 of the storage container 12. Consequently, the drive unit 26 is in direct contact with the coolant medium that is received in the storage container receiving area 14. The electrical connections for the drive unit 26 may be provided either in the region of the conveying unit 24 or in the region of the drive unit 26 of the conveying device 22. In the arrangement according to FIG. 4 it must be ensured that the drive unit 26 and electric cables are adequately sealed.

Figure 5:
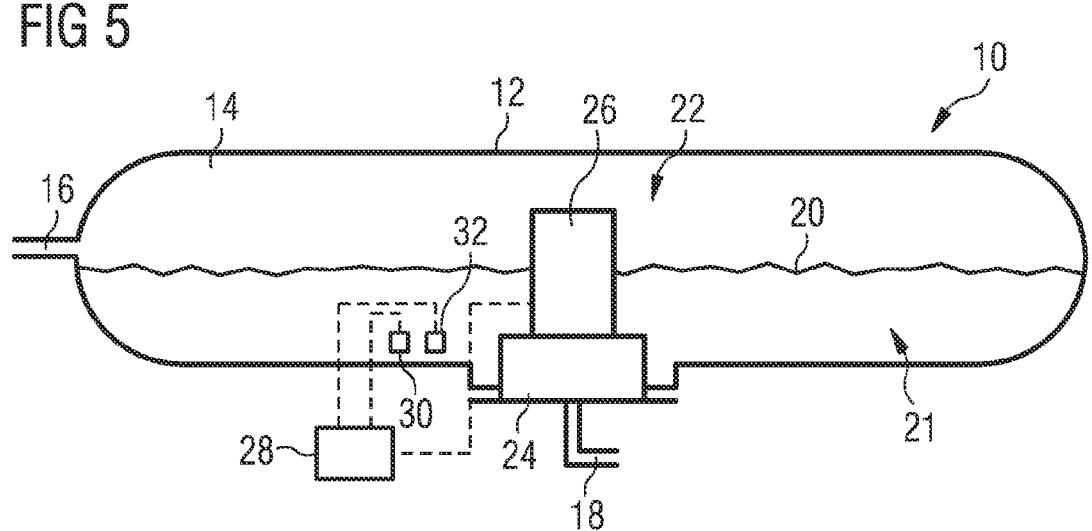
FIG. 5 shows a further storage assembly with a conveying device integrated into a horizontal storage container, wherein a drive unit of the conveying device is arranged wholly inside a receiving area of the storage container.

In the storage assembly 10 according to FIG. 5, the drive unit 26 of the conveying device 22 is arranged wholly inside the receiving area 14 of the storage container 12, so that sealing with respect to the storage container 12 is not required here. However, the electrical connections for the drive unit 26 must either be provided on the conveying unit 24 or be guided in a sealed manner into the receiving area 14 of the storage container 12.

Figure 6:
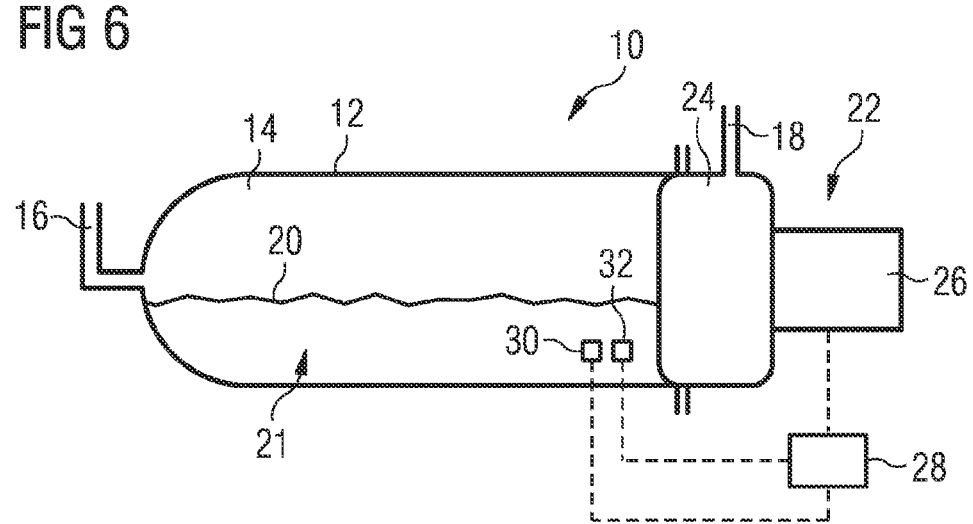
FIG. 6 shows a storage assembly with a conveying device integrated into a horizontal storage container at an end face.

In the storage assembly according to FIG. 6, the conveying device 22 is integrated into the storage container 12 in the region of an end face of a horizontal storage container 12. The conveying unit 24 is arranged at least partially in the storage container receiving area 14, while the drive unit 26 of the conveying device 22 is located outside the storage container receiving area 14. In the case of a conveying device 22 that is integrated into a horizontal storage container 12 at an end face, reinforcement of the storage container 12 and/or of the conveying device 22 in order to secure the storage assembly 10 against the pressure prevailing in the storage container receiving area 14 is not necessary. However, it is a disadvantage here that the column of liquid in the feed of the conveying device 22 is barely pronounced. Consequently, it is necessary in the case of the storage assembly 10 according to FIG. 6 to ensure, when controlling the operation, that the conveying device 22 is supplied with sufficient subcooled coolant medium in the liquid state of aggregation.

Figure 7:
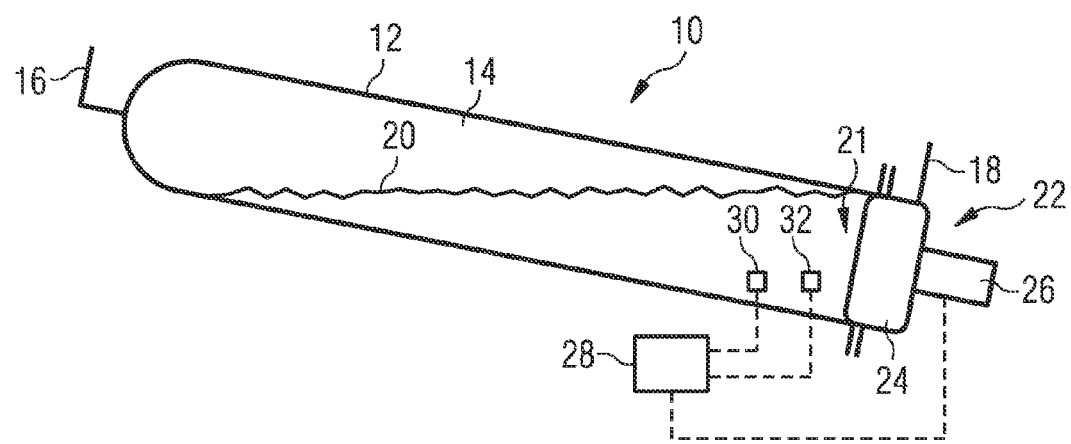
FIG. 7 shows a storage assembly with a conveying device integrated into an oblique storage container at an end face.

In the storage assembly according to FIG. 7, the conveying device 22, as in the arrangement according to FIG. 6, is integrated into the storage container 12 at an end face. However, the storage container 12 is arranged obliquely, so that the column of liquid in the feed of the conveying device 22 is more pronounced. The assembly according to FIG. 7 is suitable in particular for long and slim storage containers 12.

Figure 8:
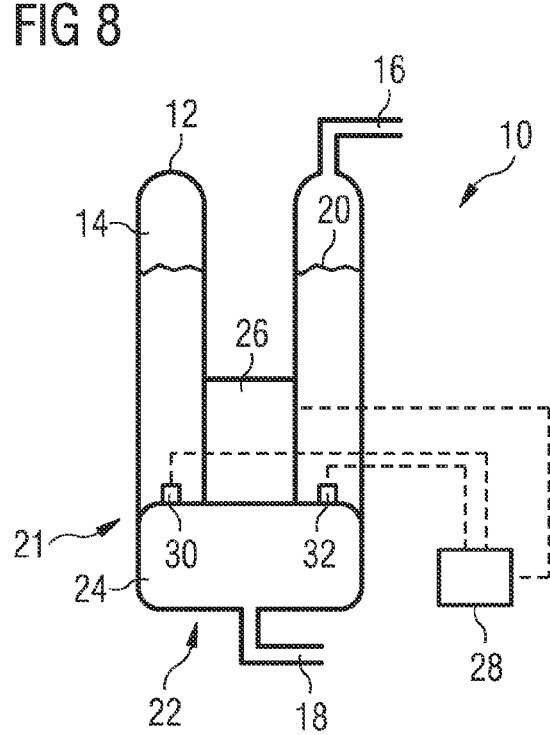
FIG. 8 shows a storage assembly with a conveying device which is integrated into a storage container, the receiving area of which has an annular cross-section.

In the storage assembly 10 according to FIG. 8, the storage container receiving area 14 has an annular cross-section. The conveying unit 24 is arranged partially inside the receiving area 14 of the storage container 12 in the region of a sump of the receiving area 14. The drive unit 26 of the conveying device 22, however, is located outside the receiving area 14. In particular, the drive unit 26 is so positioned that it is enclosed by the receiving area 14 of the storage container 12, that is to say it is positioned in the region of the center of the annulus that is defined by the receiving area 14 of the storage container 12. The storage assembly 10 according to FIG. 8 has a small installation volume, but the central arrangement of the drive unit 26 is at the expense of the volume of the storage chamber receiving area 14. In addition, it is necessary in the case of the storage assembly 10 according to FIG. 8 to provide a storage container 12 with a comparatively large diameter. This can adversely affect the weight of the storage assembly 10, because a long, slim pressurized storage container 12 can in principle be constructed lighter than a short, fat pressurized storage container 12 of the same volume.

Figure 9:
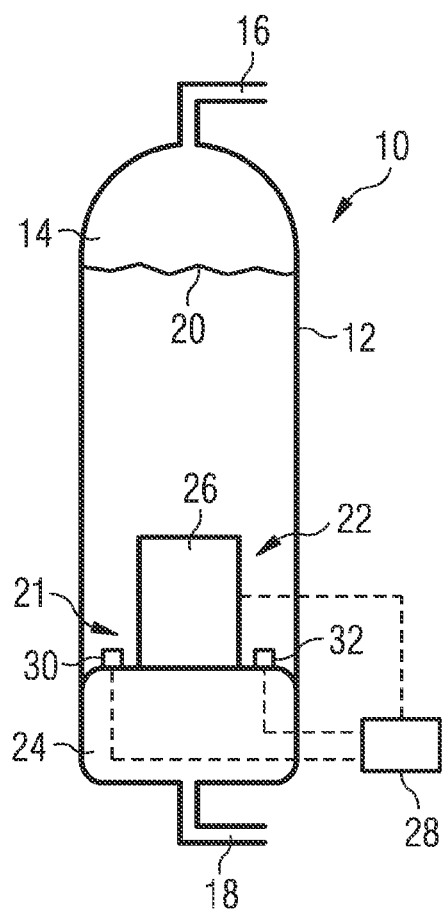
FIG. 9 shows a storage assembly with a conveying device integrated into a vertical storage container, wherein a drive unit of the conveying device is arranged inside a receiving area of the storage container.

FIG. 9 shows a storage assembly 10 which differs from the assembly according to FIG. 2 in that the drive unit 26 of the conveying device 22 is arranged inside the storage container receiving area 14. As in the configuration according to FIG. 5, this means that the electrical connections of the drive unit 26 must be connected by way of the conveying unit 24, or the electrical connections must be guided in a sealed manner into the receiving area 14 of the storage container 12.

Figure 10:
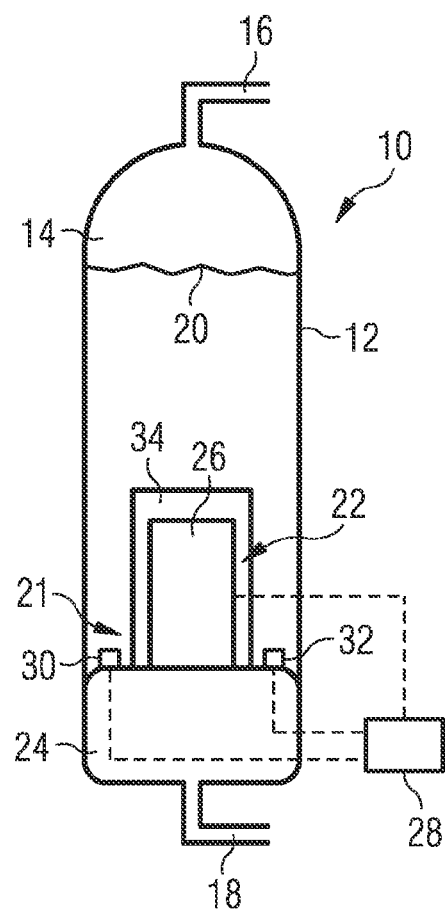
FIG. 10 shows a storage assembly with a conveying device integrated into a vertical storage container, wherein a drive unit of the conveying unit is arranged outside a receiving area of the storage container in a recess provided in the storage container.

Finally, FIG. 10 shows a storage assembly 10 which differs from the assembly according to FIG. 9 in that the drive unit 26 of the conveying device 22 is not arranged inside the storage container receiving area 14 but is positioned outside the receiving area 14 in a recess 34 provided in the storage container 12. As a result, the drive unit 26 is no longer in contact with the coolant medium in the storage container receiving area 14. However, the volume of the storage container receiving area 14 is reduced by the volume of the recess 34 provided to receive the drive unit 26. In addition, it is still necessary to provide the electrical connections for the drive unit 26 on the conveying unit 24 and to guide corresponding electric cables in a sealed manner through the conveying unit 24 to the drive unit 26.

Features described here in connection with individual embodiments of the storage assembly 10 can, of course, also be realized in different embodiments of the storage assembly. Consequently, features described in connection with specific embodiments of the storage assembly can be transferred in any desired combination to different embodiments of the storage assembly.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A storage assembly for use in a cooling system designed for an operation with a two-phase coolant medium, which comprises:
    a storage container with a receiving area for receiving a coolant medium,
    a conveying device for conveying coolant medium from the receiving area of the storage container,
    the conveying device being formed integral with the storage container of the storage assembly, and
    a control unit configured to control a drive unit of the conveying device in dependence on a state of aggregation of the coolant medium conveyed by the conveying device, in such a manner that wear of the conveying device is minimized.

2. The storage assembly according to claim 1, wherein the conveying device is a pump.

3. The storage assembly according to claim 1, wherein the conveying device comprises a pump selected from the group consisting of a gear pump, a side channel pump, a peripheral impeller pump and a centrifugal pump.

4. The storage assembly according to claim 1, wherein a conveying unit of the conveying device is arranged at least partially inside the storage container receiving area such that the conveying unit of the conveying device is flooded with the coolant medium received in the storage container receiving area.

5. The storage assembly according to claim 4, wherein the conveying unit of the conveying device is arranged at least partially in the region of a sump of the storage container receiving area such that the conveying unit of the conveying device is flooded with liquid coolant medium from the sump of the storage container receiving area.

6. The storage assembly according to claim 1, wherein a drive unit of the conveying device is arranged at least partially inside the storage container receiving area.

7. The storage assembly according to claim 1, wherein a drive unit of the conveying device is an electric motor.

8. The storage assembly according to claim 1, wherein the drive unit comprises an electric motor selected from the group consisting of an electric motor with a permanent-magnetic synchronous coupling and a canned motor.

9. The storage assembly according to claim 1, wherein the control unit is configured to determine the state of aggregation of the coolant medium conveyed by the conveying device on the basis of signals from a sensor.

10. The storage assembly according to claim 9, wherein the sensor is selected from the group consisting of a pressure sensor and a temperature sensor.

11. The storage assembly according to claim 9, wherein the sensor is located in a sump of the storage container receiving area.

12. The storage assembly according to claim 1, wherein the control unit is configured to control the drive unit of the conveying device in such a manner that the drive power of the drive unit is reduced when there is a risk that the coolant medium conveyed by the conveying device is at least partially in the gaseous state of aggregation.

13. An aircraft comprising a storage assembly for use in a cooling system designed for an operation with a two-phase coolant medium, which comprises:
    a storage container with a receiving area for receiving a coolant medium,
    a conveying device for conveying coolant medium from the receiving area of the storage container,
    the conveying device is formed integral with the storage container of the storage assembly, and
    a control unit configured to control the drive unit of the conveying device in dependence on the state of aggregation of the coolant medium conveyed by the conveying device, in such a manner that the wear of the conveying device is minimized.

* * * * *